United States Patent Office 2,868,845
Patented Jan. 13, 1959

2,868,845

PREPARATION OF 2-MENTHENE-1-OL

Robert L. Webb, Jacksonville, Fla., assignor to The Glidden Company, Cleveland, Ohio, a corporation of Ohio No Drawing. Application April 25, 1955
Serial No. 503,783

5 Claims. (Cl. 260—631)

It is the purpose of this invention to provide a method for treating alpha-terpinene-monohydrochloride to obtain valuable terpene alcohols, esters and ethers, which are useful intermediates for manufacture of thymol, carvacrol, piperitone, menthone, menthol and related compounds.

Alpha-terpinene-monohydrochloride was prepared by Wallach, Annalen, vol. 356, p. 198 (1907), by treating the hydrocarbon with an equivalent weight of dry hydrogen chloride. He found that the product he obtained could be treated with a second molar equivalent of hydrogen chloride to form a dichloride of M. P. 52° C., but he did not otherwise investigate the monohydrochloride as to reactions or structure.

Alpha-terpinene is readily produced by acid isomerization of turpentine, the pinenes, limonene and commercially-available monocyclic hydrocarbon mixtures such as originate as by-products in the synthesis of camphene, terpineol and the like. From such acid isomerization mixtures, alpha-terpinene of high purity can be fractionated.

It is therefore an object to convert alpha-terpinene to intermediates for synthesis of menthol and other flavor and perfume chemicals.

It is a further object to convert alpha-terpinene to piperitol.

It is a further object to convert alpha-terpinene to p-menthane derivatives oxygenated at the 1-, 2- and 3-positions of the p-menthane skeleton.

It is an additional object of this invention to provide a process for converting alpha-terpinene-monohydrochloride to a mixture of 3-menthene-2-ol and 2-menthene-1-ol.

I have found that alpha-terpinene-monohydrochloride can be hydrolyzed in the presence of an aqueous alkaline substance capable of neutralizing the hydrochloric acid produced on hydrolysis, and thereby there is produced a mixture of alcohols consisting of 2-p-menthene-1-ol and 3-p-menthene-2-ol, carvenol.

The 2-p-menthene-1-ol has been reported in the literature, Simonsen, The Terpenes, vol. I, 2nd ed., p. 337, but the reported synthesis is of academic interest only because of the unavailability of commercial quantities of the starting material and its high cost. This alcohol can be oxidized with Beckmann's chromic acid mixture to piperitone. Piperitone is a valuable constituent of various essential oils, and in addition, as is well known, it can be hydrogenated to menthone and menthols which are valued for their flavor and odor.

The 3-p-menthene-2-ol, carvenol, is also a known compound, Simonsen, The Terpenes, vol. I, 2nd ed., p. 348, but the method of synthesis employed is of no commercial value. Carvenol is not known to occur in nature, nor is the corresponding ketone, carvenone, which can be produced by Beckmann chromic acid oxidation of the alcohol. Carvenone possesses an odor similar to carvone, an important constituent of oil of spearmint, caraway, etc., and is therefore useful as an odor and flavor chemical. Further, carvenone can be oxidized to carvacrol, a phenol known to possess valuable antioxidant properties, or reduced to carvomenthone. Carvenol can be reduced to carvomenthol.

I further find that esters of piperitol, as well as esters of 2-menthene-1-ol and 3-menthene-2-ol, will be produced from the terpinene-hydrochloride if it is treated under displacement conditions with sodium acetate or other salt of an organic acid rather than under solvolytic conditions. By solvolytic conditions I refer to the presence of a substantial aqueous phase whereby the chloride to carbon linkage is broken in the presence of water molecules which tend to "solvolyze" the chloride ion and assist in its complete detachment from the organic portion of the molecule. Under such hydrolysis conditions, little or no piperitol results from the treatment. However, if the terpinene-monohydrochloride is treated with sodium acetate in the absence of water and suitably in the presence of a solvent such as acetic acid, then under these conditions menthenyl esters will be formed which may be saponified to yield piperitol, as well as the two alcohols produced under solvolytic conditions.

Further, either or both of the 2-menthene-1-ols can be converted to a mixture of the two piperitols by careful esterification with formic acid, suitably in the presence of a buffer such as sodium acetate. There is formed by this esterification piperityl esters which can be readily saponified to the mixed piperitols. Piperitols are readily hydrogenated to menthols, as is known.

Further, when terpinene-monohydrochloride is reacted with sodium alcoholate or alcoholic alkali, a major portion of the oxygenated material produced consists of ethers of carvenol and piperitol. Such ethers are valuable because they are readily hydrolyzed by treatment with formic acid buffered with sodium acetate, and thereby yield the formates of piperitol and carvenol, which in turn are readily saponified to the alcohols.

While I prefer to employ fairly pure alpha-terpinene for preparation of the hydrochloride, in order to simplify recovery of pure products, it is not necessay to employ a highly purified material. Such impurities as cymene do not react with hydrogen chloride. Limonene would yield limonene-monohydrochloride, which in turn would yield alpha-terpineol on hydrolysis, and this could be readily separated from the 2-menthene-1-ol resulting from alpha-terpinene conversion because of its higher boiling point, but the terpineol would be more difficult to separate from the carvenol because the boiling points of these lie close together.

Alpha-terpinene is converted to the monohydrochloride in any convenient manner. The hydrocarbon can be treated with dry hydrogen chloride or aqueous hydrogen chloride and in the presence or absence of solvent. The temperature employed is not critical. It will be found that any excess alpha-terpinene present above that required to react with the available hydrogen chloride is readily recovered after the hydrolysis step.

In carrying out the process of this invention, the alpha-terpinene-monohydrochloride is treated with a compound capable of replacing the chlorine atom with a hydroxyl group, an ester group or an ether group. Thus, the chloride will be removed with formation of alcohols if the reagent chosen is an alkali such as sodium or potassium hydroxide or an alkaline earth such as calcium hydroxide. The corresponding carbonates and bicarbonates can also be employed. While it is possible to operate under substantially anhydrous conditions, we prefer to employ aqueous systems whereby the alkaline hydrolysis agent, when used, is dissolved in water if it is soluble or suspended in water if it is insoluble. Since calcium hydroxide and calcium carbonate are both cheap and effective, they are preferred. Sodium acetate, formate or other carboxylic acid salt can also be employed, and if anhydrous conditions are employed, esters will result from displacement of the chlorine. Such treatment is not preferred, however, since the yields obtained of conversion products are somewhat lower and no particular advantage results. When using the alcoholates, anhydrous conditions are necessary if ethers are desired, since in the presence of water the alcoholates hydrolyze to the hydroxide and the alcohol.

The temperatures employed in the hydrolysis step are not critical, but hydrolysis below 60° C. is slow; and it will be found that temperatures above about 140° C. may result in undesirable decomposition. Temperatures of 80° to 125° C. are satisfactory and convenient.

After substantial or complete hydrolysis has taken place, the oil layer is separated from the aqueous layer and separated into its constituent parts, suitably by vacuum distillation. The lower boiling hydrocarbon fractions consisting largely of phellandrene and alpha-terpinene may be recycled to a succeeding hydrochlorination step, so that the starting quantity of alpha-terpinene can be finally converted to high yields of the mixed alcohols. The presence of phellandrene as an impurity in the recovered alpha-terpinene is not objectionable, since it is convertible through its hydrochloride to 2-menthene-1-ol according to the copending application of Bain et al., Serial No. 397,465, filed December 10, 1953, now Patent No. 2,827,499.

It is evident that alpha-terpinene-monohydrochloride is not a pure compound, as shown by the nature of its hydrolysis product. It is assumed that the terpinene and phellandrene recovered from the hydrolysis product result from dehydrochlorination of the chloride product and possibly also to some extent from dehydration of the alcohols in working up the hydrolysis mixture.

Upon working up the hydrolysis mixture by fractionation, some undecomposed terpinene-hydrochloride will usually be found, and this may be recycled to a new batch for hydrolysis. The next higher boiling fraction will be rich in 2-menthene-1-ol and finally 3-menthene-2-ol will distill. Little high boiling residue or polymer will remain in the still. The alcohols may be further purified by redistillation, crystallization, etc.

The following examples are illustrative of the invention:

*Example 1*

100 grams, 0.662 mole, of 90% α-terpinene was hydrochlorinated by bubbling HCl into the hydrocarbon at 25–30° C. When 24 grams of HCl, 0.662 mole, had been absorbed, the hydrochlorination was stopped.

The hydrochlorinated mixture, 200 ml. of $H_2O$, 35 grams of $Na_2CO_3$ and 35 grams of $CaCO_3$ were stirred at 100–105° C. for 18 hours. The oil layer was separated and analyzed by infrared analysis. This analysis showed that the hydrolysate contained 70–75% alcohols and 20–25% hydrocarbons. The hydrocarbons were a mixture of the phellandrenes and α-terpinene.

*Example 2*

2808 grams of 80% α-terpinene, 20.3 moles, was held at 25–30° C. while HCl was bubbled into it. When the hydrocarbon had absorbed 376 grams, 10.3 moles, the hydrochlorination was stopped.

3100 grams of the hydrochlorination product, 3000 ml. $H_2O$ and 763 grams of $Ca(OH)_2$ were agitated at 130–140° C. in an autoclave for 15 hours. The hydrolysis product was recovered by dissolving the excess lime by addition of HCl and separating the oil layer.

2830 grams of hydrolysate was recovered, indicating a weight loss of 8.8% during hydrolysis. The hydrolysate was fractionated and the fractions were analyzed by infrared analysis. This analysis indicated that they hydrolysate had the following composition:

73% hydrocarbons
3–5% chlorides of α-terpinene
18–20% alcohols
4.7% residue

The hydrocarbon fraction was 50–60% α-terpinene and 15–20% phellandrenes, as shown by comparison of its infrared spectrum with spectra of the two pure hydrocarbons.

The chloride fraction was stirred with $H_2O$, $Na_2CO_3$ and $CaCO_3$ at the boiling point of the mixture to produce a hydrolysate containing the same alcohols as listed below.

The alcohol fractions were identified as 35% cis-2-menthene-1-ol, 30% trans-2-menthene-1-ol and 35% 3-menthene-2-ol, carvenol, by comparing them with spectra of the known compounds.

While the published literature on 2-menthene-1-ol does not distinguish between the cis- and trans-forms, these isomers do exist, as shown in Example 2 of the copending Bain et al. application Serial No. 377,000, filed August 27, 1953.

The residue contained a small amount of 3-menthene-2-ol and a trace of high boiling chlorides. The remainder was presumably polymeric material.

The more vigorous hydrolysis conditions employed here resulted in isolation of less of the desired product than was attained by operating under the milder conditions specified in Example 1.

*Example 3*

1000 grams of α-terpinene and 750 grams of 36% hydrochloric acid were stirred together at 20–30° C. for 24 hours. 1127 grams of oil layer was recovered. Titration of the recovered aqueous acid layer showed that it was 20–22% hydrochloric acid.

200 grams of the oil layer, 75 grams of $CaCO_3$ and 300 ml. of water were stirred for 18 hours at 95–105° C. The unreacted $CaCO_3$ was then dissolved by adding sufficient 50% acetic acid, and the oil layer was separated to yield 177 grams of hydrolyzed oil. The hydrolyzed oil was fractionated through an efficient glass packed column. Infrared spectroanalysis of the fractions indicated that the hydrolysate had the following composition:

65% hydrocarbons, B. P. 100 mm., 104–106° C.
3–5% organic monochlorides, B. P. 10 mm., 83–85° C.
18–20% 2-p-menthene-1-ol, B. P. 10 mm., 88–90° C.
10–12% 3-p-menthene-2-ol, B. P. 10 mm., 101–103° C.

*Example 4*

200 grams of α-terpinene-chloride, prepared as in Example 2, 100 grams of sodium acetate and 800 grams of glacial acetic acid were mixed and heated for 6 hours at 50–60° C. The oil was then recovered by diluting with water. The oil layer was saponified using a 20% solution of KOH in methanol. The saponified oil was fractionated through an efficient glass packed column. Infrared spectroanalysis of the fractions showed that the saponified oil was 60–65% hydrocarbons, 5–8% organic monochlorides, 6–8% 2-p-menthene-1-ol, 8–10% 1-p-menthene-3-ol, piperitols, and 8–10% 3-p-menthene-2-ol.

*Example 5*

200 grams of the organic chloride prepared as in Example 2, 50 grams NaOH and 500 ml. of methanol were mixed and allowed to stand 24 hours at 20–25° C. The oil was recovered by diluting with water. The oil recovered was fractionated through an efficient glass packed column. Infrared spectroanalysis of the fractions indicated that the hydrolysis product was 65–70% hydrocarbons, α-terpinene containing some α-phellandrene, 3–5% organic monochlorides, 8–10% unsaturated ethers, B. P. 10 mm., 83–85° C., and 10–12% alcohols, composed of 60–70% 2-p-menthene-1-ol and 30–40% of 3-p-menthene-2-ol.

*Example 6*

10 grams of 2-p-menthene-1-ol and a solution of 4 grams of anhydrous sodium acetate in 25 grams of 90% formic acid were cooled separately to 0° C. and then mixed. The mixture was agitated at 0–10° C. for 18 hours. The mixture was then saponified by refluxing it with a solution of excess 10% KOH in methanol. Infrared spectroanalysis of the saponification product showed that it was a mixture of 90–95% piperitols and 5–10% 2-p-menthene-1-ol. The piperitols were a mixture of about equal quantities of cis- and trans-forms.

It will be understood that the foregoing examples are merely illustrative and that many variations can be made therein without departing from the invention.

Thus, while only sodium compounds have been employed as the alkali metal compounds in the examples, other analogous alkali metal compounds such as the potassium and lithium hydroxides and carbonates can be substituted therefor. Similarly, other alkaline earth metal bases such as barium and strontium hydroxides and carbonates can be used.

Also salts of other alkali metals with other acids than acetic can be employed, as can alcoholates of other metals and other alcohols, the choice of which is primarily determined by economics and convenience.

It will be appreciated, of course, that when water is present, the alkali metal and alkaline earth metal oxides can be employed for the treatment of the α-terpinene-hydrochloride. This is because in the presence of water the hydroxide is formed. In fact, any compound of the general formula $M_aX_b$, wherein M is a positive radical, which when combined with the —OH radical forms a relatively strong base, X is a monovalent negative radical, which when combined with hydrogen forms a compound of relatively weak acidity, $a$ is a small whole number equal to the valence of X, and $b$ is a small whole number equal to the valence of M, or which forms such a compound under the conditions employed, can be used for the treatment. It will also be appreciated that for the highest yields of replacement products, it will be preferred not to use the strong bases, at least exclusively, because of the dehydrochlorinating side reaction.

When employing replacement conditions, other solvents of low dielectric constants can be employed, or, if desired, the treatment can be carried out in the absence of solvent. The use of a solvent is preferred, however.

Having described the invention, what is claimed is:

1. The process of preparing 2-menthene-1-ol which comprises treating α-terpinene with not more than one mole of HCl to form a monohydrohalide, and hydrolyzing the resulting chloride with water in the presence of a basic compound, said basic material being present in an amount sufficient to neutralize HCl formed during the hydrolysis.

2. The process of claim 1 in which the basic compound is selected from the class consisting of alkali metal and alkaline earth metal hydroxides, carbonates, carboxylic acid salts and alcoholates.

3. The process of claim 1 in which the basic compound is calcium carbonate.

4. The process for producing 2-menthene-1-ol which comprises hydrolyzing α-terpinene monohydrochloride with water in the presence of a basic material, said base being sufficient to neutralize hydrochloric acid formed during the hydrolysis.

5. The process for preparing 2-p-menthene-1-ol which comprises treating α-terpinene with not more than one mole of HCl to form a monohydrohalide and hydrolyzing the resulting monohydrohalide in the presence of a basic inorganic hydroxide in an amount sufficient to neutralize the HCl formed during the hydrolysis.

References Cited in the file of this patent

UNITED STATES PATENTS

| 1,478,690 | Andreau | Dec. 25, 1923 |
| 2,609,388 | Knapp et al. | Sept. 2, 1952 |

FOREIGN PATENTS

| 532,614 | Great Britain | Jan. 28, 1941 |

OTHER REFERENCES

Wallach: Annalen, vol. 356, pp. 198–9 (1907).

Weygand: Organic Preparations, Interscience, N. Y., 1945; pp. 154–155.

Wagner: "Manufacture of Terpineol–1," Manufacturing Chemist XXII, March 1951, p. 99.

Tishchenko et al.: J. Gen. Chem. (Russia), vol. 22, pp. 798–802; (1952), Chem. Abs. 47, 5383e.

Royals: "Advanced Organic Chemistry," Prentice-Hall, Englewood Cliffs, N. J., 1954; pp. 264, 404, 405.